(12) United States Patent
Anderson

(10) Patent No.: US 6,427,165 B1
(45) Date of Patent: Jul. 30, 2002

(54) METHOD AND APPARATUS FOR INFORMATION RETRIEVAL FROM A NETWORK USING PARAMETER VALUE SAMPLING

(75) Inventor: Glen J. Anderson, Sioux City, IA (US)

(73) Assignee: Gateway, Inc., Poway, CA (US)

( * ) Notice: Subject to any disclaimer, the term of this patent is extended or adjusted under 35 U.S.C. 154(b) by 0 days.

(21) Appl. No.: 09/195,531

(22) Filed: Nov. 18, 1998

(51) Int. Cl.[7] ............................................... G06F 15/16
(52) U.S. Cl. ..................... 709/217; 709/218; 709/203; 707/10
(58) Field of Search ................................ 709/217, 218, 709/203; 707/10

(56) References Cited

U.S. PATENT DOCUMENTS

| | | | |
|---|---|---|---|
| 5,049,873 A | | 9/1991 | Robins et al. |
| 5,261,044 A | | 11/1993 | Dev et al. |
| 5,530,806 A | * | 6/1996 | Condon et al. ............... 714/49 |
| 5,572,643 A | | 11/1996 | Judson |
| 5,659,732 A | * | 8/1997 | Kirsch ........................... 707/5 |
| 5,687,292 A | | 11/1997 | Boda et al. |
| 5,721,908 A | * | 2/1998 | Lagarde et al. ............... 707/10 |
| 5,768,508 A | | 6/1998 | Eikeland |
| 5,768,524 A | | 6/1998 | Schmidt |
| 5,768,578 A | | 6/1998 | Kirk et al. |
| 5,771,226 A | | 6/1998 | Kaku |
| 5,774,668 A | | 6/1998 | Choquier et al. |
| 5,774,669 A | | 6/1998 | George et al. |
| 5,890,172 A | * | 3/1999 | Borman et al. ............. 707/501 |
| 5,907,837 A | * | 5/1999 | Ferrel et al. .................... 707/3 |
| 6,006,252 A | * | 12/1999 | Wolfe ........................... 709/203 |
| 6,009,459 A | * | 12/1999 | Belfiore et al. ............. 709/203 |
| 6,175,830 B1 | * | 1/2000 | Maynard ........................ 707/5 |
| 6,108,652 A | * | 8/2000 | Buyukkoc ....................... 707/5 |
| 6,108,686 A | * | 8/2000 | Williams, Jr. ............... 709/202 |
| 6,163,804 A | * | 12/2000 | Matsui ........................ 709/219 |

* cited by examiner

Primary Examiner—Krisna Lim
(74) Attorney, Agent, or Firm—Mark S. Walker; Walter J. Malinowski Suiter & Associates PC (57) ABSTRACT

A method and apparatus for selectively obtaining information over a network with an information handling system coupled to the network are disclosed. The network is searched for the information based upon a predetermined criterion, and the information is located on a node of the network where the information is stored. A parameter value of the node where the information is stored is determined, and the determined parameter value is displayed in conjunction with a link to the node whereby a determination may be made whether to obtain the information from the node based upon the determined parameter value. The search results may be ordered and selected according to one or more of determined parameter values of the nodes where the information is stored.

44 Claims, 4 Drawing Sheets

METHOD AND APPARATUS FOR INFORMATION RETRIEVAL FROM A NETWORK USING PARAMETER VALUE SAMPLING

FIELD OF THE INVENTION

The present invention generally relates to the field of information handling systems, and particularly to information handling system networks.

BACKGROUND OF THE INVENTION

Interconnection of information handling systems in local and worldwide networks such as the Internet has dramatically altered the manner in which users of information handling systems search for and gather information. Although the information handling systems in larger networks are configured to communicate using standard or compatible communications protocols, not every node in the network is equivalent to any other given node in the network, especially when worldwide networks are considered. For example, the characteristics of connection pathways between any two given nodes may drastically vary from the connection pathways between any two other nodes on the network. Thus, the bandwidth and connection rate between any two nodes in the network may vary across the network so that the transfer rate of information varies non-uniformly across the entire network. Furthermore, information and resources at a given node may not be maintained or updated in the same manner as for other nodes. For example, information about a given subject stored at one node may be updated daily, whereas the same information stored at a different node may be updated only weekly. Furthermore, due to administrative maintenance, network traffic, system failures, etc., information may be stored at a given node on the network but may be unavailable at certain times. Although present systems exist that search a network for information based on content and subject matter, and although information may be duplicated at multiple sources, a user of an information handling system may waste time in attempting to retrieve information from a source that is slow, overloaded, or unavailable, or for which the user does not have the required software, and in subsequently hunting the network for an available source since technical status information about the source is unavailable. As network communication rates increase with the advent of new technologies, specific connection rate and other technical information would become even more useful because not every node on a network may be available at the same connection rate or under the same conditions. Furthermore, even at faster rates, the performance of a given connection to a node or server will vary based upon, among other reasons, network traffic at the source, source server loading, source server performance, and source availability.

All of the aforementioned problems, and many others, impede efficient information finding, gathering and browsing processes. Thus, there lies a need to overcome the inefficient navigation of a non-homogenous information network.

SUMMARY OF THE INVENTION

The present invention is directed to a method for selectively obtaining information over a network with an information handling system coupled to the network. In one embodiment, the method includes steps for searching the network for the information based upon a predetermined criterion, locating the information on a node of the network where the information is stored, determining a parameter value of the node where the information is stored, and displaying the determined parameter value in conjunction with a link to the node whereby a determination may be made whether to obtain the information from the node based upon the determined parameter value.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiment of the invention, an example of which is illustrated in the accompanying drawings.

Figure 1:
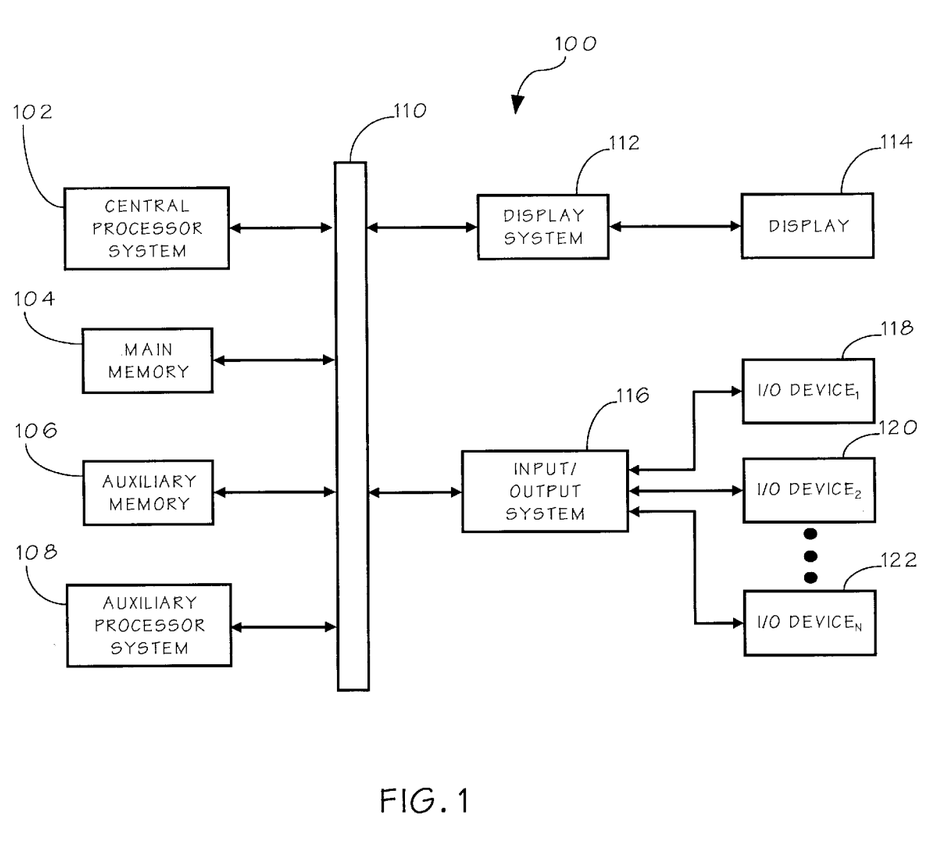
FIG. 1 is a block diagram of an information handling system operable to embody the present invention.

Referring now to FIG. 1, a hardware system in accordance with the present invention is shown. The hardware system shown in FIG. 1 is generally representative of the hardware architecture of an information handling system of the present invention. A central processor 102 controls the information handling system 100. Central processor 102 includes a central processing unit such as a microprocessor or microcontroller for executing programs, performing data manipulations and controlling the tasks of information handling system 100. Communication with central processor 102 is implemented through a system bus 110 for transferring information among the components of information handling system 100. Bus 110 may include a data channel for facilitating information transfer between storage and other peripheral components of information handling system 100. Bus 110 further provides the set of signals required for communication with central processor 102 including a data bus, address bus, and control bus. Bus 110 may comprise any state of the art bus architecture according to promulgated standards, for example industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and so on. Furthermore, bus 100 may be compliant with any promulgated industry standard. For example, bus 100 may be designed in compliance with any of the following bus architectures: Industry Standard Architecture (ISA), Extended Industry Standard Architecture (EISA), Micro Channel Architecture, Peripheral Component Interconnect (PCI), Universal Serial Bus (USB), Access.bus, IEEE P1394, Apple Desktop Bus (ADB), Concentration Highway Interface (CHI), Fire Wire, Geo Port, or Small Computer Systems Interface (SCSI), for example.

Other components of information handling system 100 include main memory 104, auxiliary memory 106, and an auxiliary processor 108 as required. Main memory 104 provides storage of instructions and data for programs executing on central processor 102. Main memory 104 is typically semiconductor based memory such as dynamic random access memory (DRAM) and or static random access memory (SRAM). Auxiliary memory 106 provides storage of instructions and data that are loaded into the main memory 104 before execution. Auxiliary memory 106 may include semiconductor based memory such as read-only memory (ROM), programmable read-only memory (PROM) erasable programmable read-only memory (EPROM), electrically erasable read-only memory (EEPROM), or flash memory (block oriented memory similar to EEPROM). Auxiliary memory 106 may also include a variety of non-semiconductor based memories, including but not limited to magnetic tape, drum, floppy disk, hard disk, optical, laser disk, compact disc read-only memory (CD-ROM), digital versatile disk read-only memory (DVD-ROM), digital versatile disk random-access memory (DVD-RAM), etc. Other varieties of memory devices are contemplated as well. Information handling system 100 may optionally include an auxiliary processor 108 which may be a digital signal processor (a special-purpose microprocessor having an architecture suitable for fast execution of signal processing algorithms), a back-end processor (a slave processor subordinate to the main processing system), an additional microprocessor or controller for dual or multiple processor systems, or a coprocessor.

Information handling system 100 further includes a display system 112 for connecting to a display device 114, and an input/output (I/O) system 116 for connecting to one or more I/O devices 118, 120 up to N number of I/O devices 122. Display system 112 may comprise a video display adapter having all of the components for driving the display device, including video random access memory (VRAM), buffer, and graphics engine as desired. Display device 114 may comprise a cathode ray-tube (CRT) type display such as a monitor or television, or may comprise alternative type of display technologies such as a liquid-crystal display (LCD), a light-emitting diode (LED) display, or a gas or plasma display. Input/output system 116 may comprise one or more controllers or adapters for providing interface functions between one or more of I/O devices 118–122. For example, input/output system 116 may comprise a serial port, parallel port, infrared port, network adapter, printer adapter, radio-frequency (RF) communications adapter, universal asynchronous receiver-transmitter (UART) port, etc., for interfacing between corresponding I/O devices such as a mouse, joystick, trackball, trackpad, trackstick, infrared transducers, printer, modem, RF modem, bar code reader, charge-coupled device (CCD) reader, scanner, compact disc (CD), compact disc read-only memory (CD-ROM), digital versatile disc (DVD), video capture device, touch screen, stylus, electroacoustic transducer, microphone, speaker, etc, Input/output system 116 and I/O devices 118–122 may provide or receive analog or digital signals for communication between information handling system 100 of the present invention and external devices, networks, or information sources. Input/output system 116 and I/O devices 118–122 preferably implement industry promulgated architecture standards, including Recommended Standard 232 (RS-232) promulgated by the Electrical Industries Association, Infrared Data Association (IrDA) standards, Ethernet IEEE 802 standards (e.g., IEEE 802.3 for broadband and baseband networks, IEEE 802.3z for Gigabit Ethernet, IEEE 802.4 for token passing bus networks, IEEE 802.5 for token ring networks, IEEE 802.6 for metropolitan area networks, 802.11 for wireless networks, and so on), Fibre Channel, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on. It should be appreciated that modification or reconfiguration of information handling system 100 of FIG. 1 by one having ordinary skill in the art would not depart from the scope or the spirit of the present invention.

Figure 2:
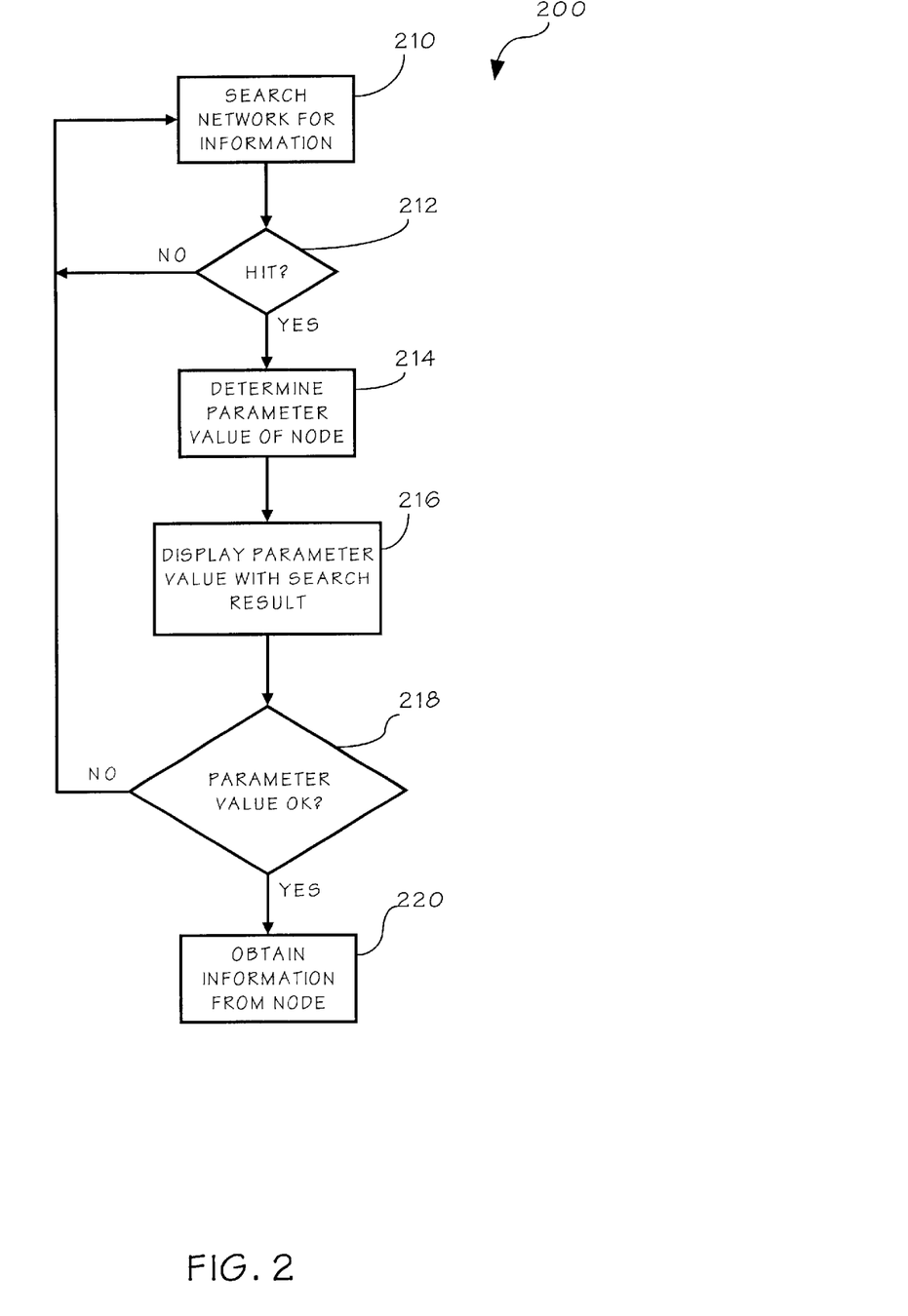
FIG. 2 is a flow diagram of a method for determining technical access information regarding an information source on a network in accordance with the present invention.

Referring now to FIG. 2, a flow diagram of a method for determining technical access information regarding an information source on a network in accordance with the present invention will be discussed. The method 200 initiates at step 210 upon a network search engine, executing as a program on information handling system 100, searching a network for information according to a predetermined criterion. For example, a search engine may be instructed by an operator of information handling system 100 to search the Internet for sources of information on the Internet regarding the Gettysburg Address or President Kennedy's Moon Mission Pledge Speech. A determination is made at step 212 whether an information source, a node on the network, satisfies the search criterion by containing the desired information, also know as a "hit". If no information source is found, the network continues to be searched until a predetermined condition is met, for example, a time-out period has passed or until a site containing the desired information is found. If a "hit" is found, a determination is made at step 214 of a technical parameter of the node at which the information is located. For example, a determination may be made whether the node is currently accessible or not accessible at the present time. The node in question may not be presently available for maintenance reasons, or access to the node may be restricted to only certain qualified users who satisfy certain conditions. Alternatively, the connection rate to the node may be determined such that the time required to access information of a given size may be determined therefrom. Thus, a parameter value of the node may be determined, e.g., connection speed, download time, time of node availability, node capacity, node loading (number of present connections divided by the maximum number of connections), etc. A determined parameter value may also include whether a fee is required to access the node or to access some or all of the information contained on the node. For example, a user may provide credit card information, an account number, password, etc. for verifying or securing the payment or promise of payment of a fee that is a condition precedent to a grant of authority or permission to access the node. Upon the securing or verification of the fee or promise of payment, the user may be granted access to the node and information contained on the node. The determined parameter value may be measured by information handling system 100 directly, may be received from the node itself, or may be determined by a combination thereof. The determined parameter value may then be displayed on a display 114 of information handling system 100 and may be displayed along with the results of search itself at step 216. A determination is made at step 218 whether the determined parameter value is acceptable such that information may be accessed from the node in question. For example, if the connection rate has such a low value that the download time for a given size of information file is too great, then time will not be wasted in attempting to download the information, and an alternative node containing the desired information may be located at step 210. If the determined parameter value has an acceptable value, the information may be obtained from the node in question at step 220.

Figure 3:
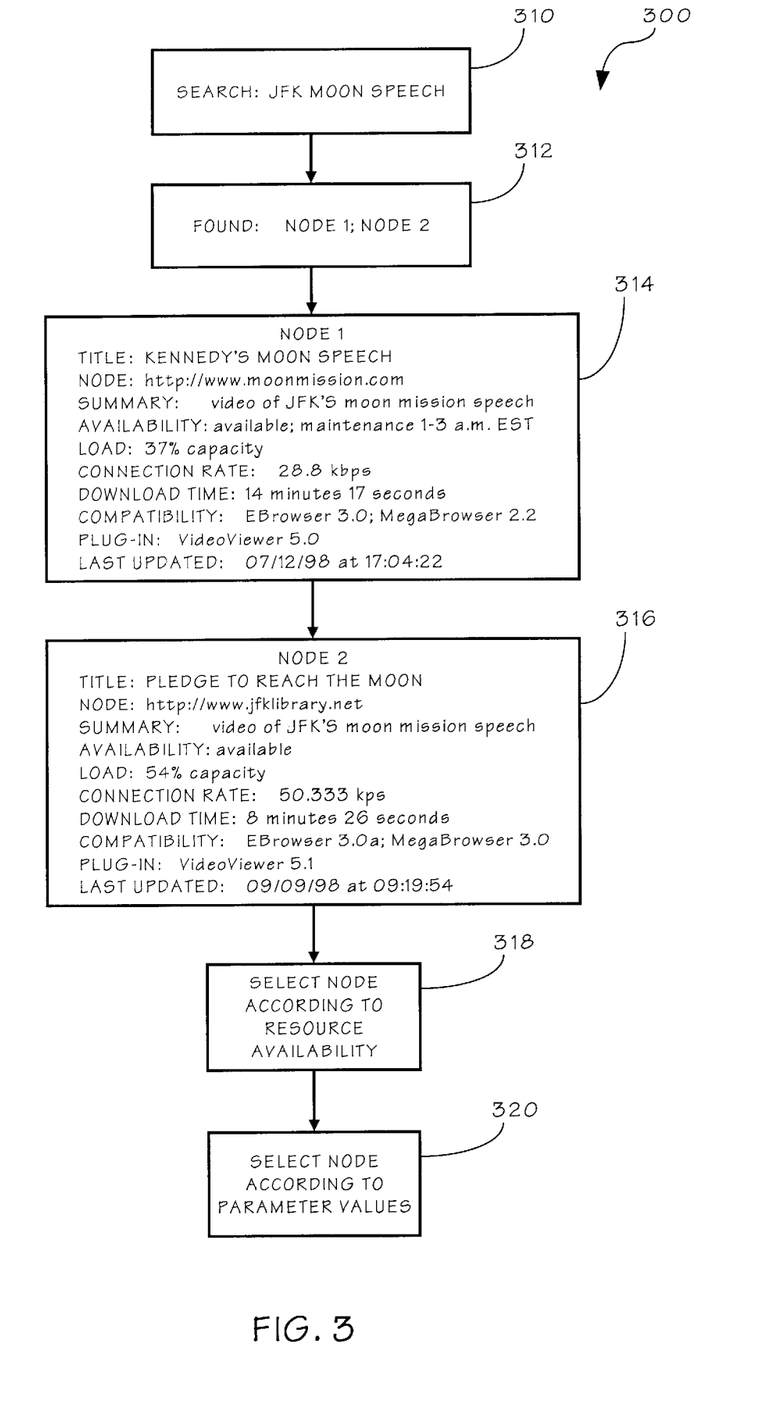
FIG. 3 is a flow diagram of a method in accordance with the present invention.

Referring now to FIG. 3, a flow diagram of a method in accordance with the present invention will be discussed. The method 300 begins with a search for information possibly located on a network at step 310. For example, a user may instruct a search engine to search the Internet for information regarding President Kennedy's speech about the goal of landing men on the moon. The user would type in the string "JFK MOON SPEECH", and based upon the text, the search engine would look for nodes on the network containing the words of the text string. When the search engine finds two nodes, Node 1 and Node 2, as indicated at 312, containing matches for the search string words, the search engine may then determine not only context information regarding each node but may also determine technical information regarding each node. Information regarding Node 1 is displayed as shown at step 314. Information regarding Node 2 is displayed as shown at step 316. Steps 314 and 316 may occur simultaneously. Thus, content information may be displayed such as the title of the found information (TITLE), the node name, location or uniform resource locator (URL) of the node at which the information is located (NODE), and a summary of the information contained on the node (SUMMARY). In addition to content information, technical information regarding the node is also displayed such as the availability of the node (AVAILABILITY), node loading, expressed as a percentage of maximum capacity (LOAD), connection rate to that node (CONNECTION RATE), time required to download the information located at the node (DOWNLOAD TIME), the type of browser or software required to properly view the information contained at the node (COMPATIBILITY), what plug-ins or other software components are required in order to properly view and obtain the information located at the node (PLUG-IN), and the time and date when the information at the node was last updated (LAST UPDATED), for example. In addition, other relevant technical information concerning the node may be provided as required or appropriate, including but not limited to operating system or applet languages or scripts, etc. Thus, a user or a software program may view the information for each node at 314 and 316 and make a determination as to which node is more appropriate for obtaining the desired information. This determination may be based not only upon the content of the information stored at a given node but also upon technical parameter values of each node. The node from which the information is obtained may be selected according to the availability of resources required to obtain the information as indicated at step 318. For example, the selection may be based upon whether information handling system 100 has the correct browser software and software version or the required plug-in software to view the information correctly. Thus, if the user has VideoViewer 5.0 but does not have VideoViewer 5.1, the user would select to obtain the information, a video clip of JFK's moon mission speech, from Node 1 since Node 2 requires VideoViewer 5.1. Alternatively, the node from which the information is obtained may be selected according to the parameter values for each node as indicated at step 320. For example, the selection may be made based upon the faster connection rate or the shorter download time. Thus, the user would select to obtain the information from Node 2 since a higher connection rate, and a shorter download time, is available from Node 2. The determinations may also be made in combination such that the relevant parameter values are optimized for the given available resources. For example, first, nodes may be selected or eliminated based upon content. If the content of a given node is not relevant to the search inquiry, then that node may be omitted from consideration. Then, nodes that are not presently available may be omitted from consideration. Next, a determination may be made whether information handling system 100 has sufficient resources for obtaining the information from the available nodes. Nodes for which proper resources are unavailable may be omitted from consideration. Subsequently, the node with the optimum parameter value may be selected from the remaining available nodes, and the information obtained from the node having an optimum parameter value. Performing such a process 300 prior to connecting to any of the nodes, or a similar process, saves the user from having to connect to each node to make a determination of the technical status of each node only after connecting to each node.

Figure 4:
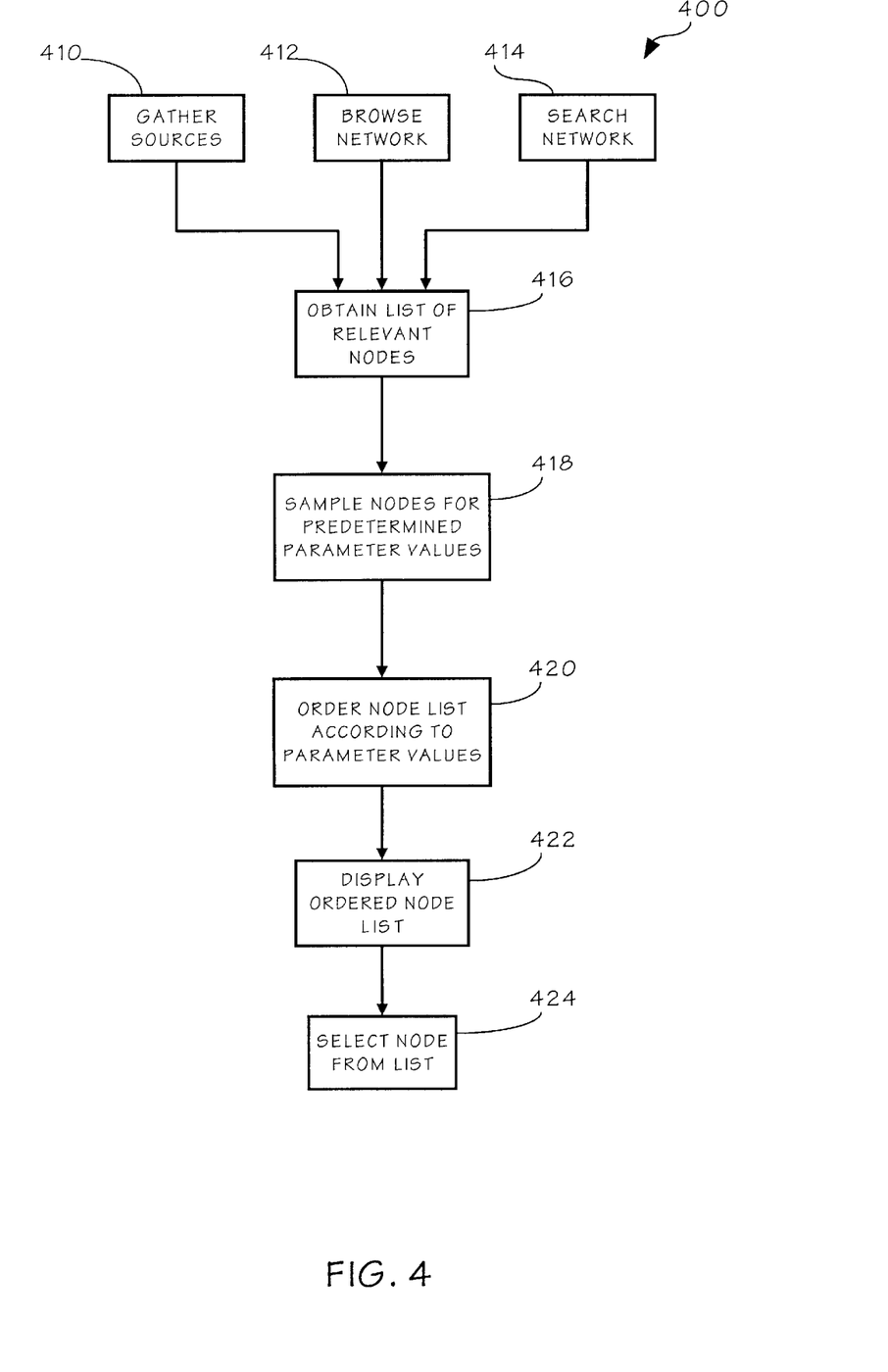
FIG. 4 is a flow diagram of a method for obtaining information from a network based upon a predetermined technical parameter of a given node in accordance with the present invention.

Referring now to FIG. 4, a method for obtaining information from a network based upon one or more technical parameters of a given node in accordance with the present invention will be discussed. The method 400 shown in FIG. 4 may be utilized in several manners by one or more different programs executing on information handling system 100. For example, method 400 may begin with a program running on information handling system 100 for gathering sources at step 410 for a certain type of information. The sources may be news sources for current events or in a given category (i.e., computer technology new, medical technology news, weather news, etc.). Alternatively, method 400 may begin with a program running on information handling system 100 for browsing the network at step 412 for casually finding information of interest or entertainment. Such a program may be a network browser program such as an Internet browser. Further, method 400 may begin with a program running on information handling system 100 for searching for specific information at step 414 that may be located at a node or server on the network. Such a program may be a search engine program. After executing any of steps 410, 412 or 414, a list of relevant nodes or servers on the network that contain relevant information may be obtained at step 416. Each of the nodes on the network may be sampled at step 418 for a specific, predetermined parameter value such as connection rate, for example. After the predetermined parameter value or values are obtained and determined, the list of nodes may be ordered at step 420 according to the determined parameter values (e.g., faster connection rate nodes being listed before lower connection rate nodes). The ordered list of relevant nodes is then displayed at step 422 on display 114 of information handling system 100. Subsequently, a user of information handling system 100 may select an appropriate node at step 424 based upon the ordered parameter values.

The methods of the present invention disclosed herein may be applied not only to displaying search results, but also to general network and Internet browsing. For example, when an Internet user is "surfing the net" for entertainment, the experience could be enhanced by advance knowledge of which connections would perform better than other similar connection. Sampling of the nodes for a predetermined parameter value may not only be done while a user waited for the results, but could be performed as a background process while performing other tasks as system resources of information handling system 100 allow. Such an application may be for content "pushing" type programs that may be constantly updated wherein the program automatically gathers information from the network and downloads the information to information handling system 100 without intervention by the user. The nodes or servers from which information is pushed to information handling system 100 may be based upon the predetermined parameter values, and not merely upon content of the nodes alone. A program of instructions for implementing the method of the present invention and for formatting and displaying the results may be integrated within a network browser or search engine as a later added plug-in or specifically designed into the architecture of a specific browser or search engine.

Although the invention has been described with a certain degree of particularity, it should be recognized that elements thereof may be altered by persons skilled in the art without departing from the spirit and scope of the invention. One of the embodiments of the invention can be implemented as sets of instructions resident in the main memory 104 of one or more computer systems configured generally as described in FIG. 1. Until required by the computer system, the set of instructions may be stored in another computer readable memory such as auxiliary memory 106 of FIG. 1, for example in a hard disk drive or in a removable memory such as an optical disk for utilization in a CD-ROM drive, a floppy disk for utilization in a floppy disk drive, a floptical disk for utilization in a floptical drive, or a personal computer memory card for utilization in a personal computer card slot. Further, the set of instructions can be stored in the memory of another computer and transmitted over a local area network or a wide area network, such as the Internet, when desired by the user. Additionally, the instructions may be transmitted over a network in the form of an applet that is interpreted or compiled after transmission to the computer system rather than prior to transmission. One skilled in the art would appreciate that the physical storage of the sets of instructions or applets physically changes the medium upon which it is stored electrically, magnetically, chemically, physically, optically or holographically so that the medium carries computer readable information.

It is believed that the method and apparatus for information retrieval from a network using parameter value sampling of the present invention and many of its attendant advantages will be understood by the forgoing description, and it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. A method for selectively obtaining information over a network with an information handling system coupled to the network, comprising:

searching the network for the information based upon a predetermined criterion;

locating the information on a node of the network where the information is stored;

determining a parameter value of the node where the information is stored; and displaying the determined parameter value in conjunction with a link to the node whereby a determination may be made whether to obtain the information from the node based upon the determined parameter value, the determined parameter value being one of the group consisting of node availability, present load percentage of node capacity, a connection rate between the node and the information handling system, a time required to download the information stored on the node from the node to the information handling system, compatibility of a program executing on the information handling system and the information stored on the node, whether a required program for utilizing the information stored on the node is available on the information handling system, a date when the information stored on the node was last updated, and whether a fee is required to access information stored on the node.

2. A method as claimed in claim 1, the determined parameter value being node availability.

3. A method as claimed in claim 1, the determined parameter value being present load percentage of node capacity.

4. A method as claimed in claim 1, the determined parameter value being a connection rate between the node and the information handling system.

5. A method as claimed in claim 1, the determined parameter value being a time to download the information stored on the node from the node to the information handling system.

6. A method as claimed in claim 1, the determined parameter value being compatibility of a program executing on the information handling system and the information stored on the node.

7. A method as claimed in claim 1, the determined parameter value being whether a required program for utilizing the information stored on the node is available on the information handling system.

8. A method as claimed in claim 1, the determined parameter value being whether a date when the information stored on the node was last updated.

9. A method as claimed in claim 1, the determined parameter value being whether a fee is required to access information stored on the node.

10. A method for selectively obtaining information over a network with an information handling system coupled to the network, comprising:

searching the network for the information based upon a predetermined criterion;

locating the information on a node of the network where the information is stored;

determining a parameter value of the node where the information is stored; and displaying the determined parameter value in conjunction with a link to the node whereby a determination may be made whether to obtain the information from the node based upon the determined parameter value, said locating step and said determining step being executed while the information handling system performs other tasks.

11. A method for selectively obtaining information over a network with an information handling system coupled to the network, comprising:

searching the network for the information based upon a predetermined criterion;

locating the information on a node of the network where the information is stored;

determining a parameter value of the node where the information is stored;

displaying the determined parameter value in conjunction with a link to the node whereby a determination may be made whether to obtain the information from the node based upon the determined parameter value;

locating the information on additional nodes of the network;

creating a list of the nodes where the information is stored;

determining the parameter value for each of the additional nodes where the information is stored; and ordering the node list according to the determined parameter values.

12. A method as claimed in claim 11, further comprising the step of displaying the ordered node list on a display of the information handling system.

13. A method as claimed in claim 11, further comprising the step of selecting a node from the ordered node list from which to obtain the information based upon the determined node parameters.

14. A program of instructions storable on a medium readable by an information handling system for causing the information handling system to execute steps for selectively obtaining information over a network with the information handling system coupled to the network, the steps comprising:

searching the network for the information based upon a predetermined criterion, locating the information on a node of the network where the information is stored;

determining a parameter value of the node where the information is stored; and displaying the determined parameter value in conjunction with a link to the node whereby a determination may be made whether to obtain the information from the node based upon the determined parameter value, the determined parameter value being one of the group consisting of node availability, present load percentage of node capacity, a connection rate between the node and the information handling system, a time required to download the information stored on the node from the node to the information handling system, compatibility of a program executing on the information handling system and the information stored on the node, whether a required program for utilizing the information stored on the node is available on the information handling system, a date when the information stored on the node was last updated, and whether a fee is required to access information stored on the node.

15. A program of instructions as claimed in claim 14, the determined parameter value being node availability.

16. A program of instructions as claimed in claim 14, the determined parameter value being present load percentage of node capacity.

17. A program of instructions as claimed in claim 14, the determined parameter value being a connection rate between the node and the information handling system.

18. A program of instructions as claimed in claim 14, the determined parameter value being a time to download the information stored on the node from the node to the information handling system.

19. A program of instructions as claimed in claim 14, the determined parameter value being compatibility of a program executing on the information handling system and the information stored on the node.

20. A program of instructions as claimed in claim 14, the determined parameter value being whether a required program for utilizing the information stored on the node is available on the information handling system.

21. A program of instructions as claimed in claim 14, the determined parameter value being whether a date when the information stored on the node was last updated.

22. A program of instructions as claimed in claim 14, the determined parameter value being whether a fee is required to access information stored on the node.

23. A program of instructions storable on a medium readable by an information handling system for causing the information handling system to execute steps for selectively obtaining information over a network with the information handling system coupled to the network, the steps comprising:

searching the network for the information based upon a predetermined criterion;

locating the information on a node of the network where the information is stored;

determining a parameter value of the node where the information is stored; and displaying the determined parameter value in conjunction with a link to the node whereby a determination may be made whether to obtain the information from the node based upon the determined parameter value, said locating step and said determining step being executed while the information handling system performs other tasks.

24. A program of instructions storable on a medium readable by an information handling system for causing the information handling system to execute steps for selectively obtaining information over a network with the information handling system coupled to the network, the steps comprising:

searching the network for the information based upon a predetermined criterion;

locating the information on a node of the network where the information is stored;

determining a parameter value of the node where the information is stored; and ordering the node list according to the determined parameter values.

25. A program of instructions as claimed in claim 24, the steps further comprising the step of displaying the ordered node list on a display of the information handling system.

26. A program of instructions as claimed in claim 24, the steps further comprising the step of selecting a node from the ordered node list from which to obtain the information based upon the determined node parameters.

27. An information handling system for selectively obtaining information over a network with the information handling system coupled to the network, comprising:

a processor for executing a program of instructions on tile information handling system;

a memory coupled to the processor for storing the proven of instructions executable by said processor; and an input and output system coupled to the processor for coupling the information handling system to the network wherein the program of instructions configures the information handling system to determine a parameter value regarding a node on the network where information is stored such that a determination may be made whether to obtain the information from the node with the information handling system based upon the determined parameter value, the determined parameter value being one of the group consisting of node availability, present load percentage of node capacity, a connection rate between the node and the information handling system, a time required to download the information stored on the node from the node to tie information handling system, compatibility of a program executing on the information handling system and the information stored on the node, whether a required program for utilizing the information stored on the node is available on the information handling system, a date when the information stored on the node was last updated, and whether a fee is required to access information stored on the node.

28. An information handling system as claimed in claim 27, the determined parameter value being node availability.

29. An information handling system as claimed in claim 27, the determined parameter value being present load percentage of node capacity.

30. An information handling system as claimed in claim 27, the determined parameter value being a connection rate between the node and the information handling system.

31. An information handling system as claimed in claim 27, the determined parameter value being a time to download the information stored on the node from the node to the information handling system.

32. An information handling system as claimed in claim 27, the determined parameter value being compatibility of a program executing on the information handling system and the information stored on the node.

33. An information handling system as claimed in claim 27, the determined parameter value being whether a required program for utilizing the information stored on the node is available on the information handling system.

34. An information handling system as claimed in claim 27, the determined parameter value being whether a date when the information stored on the node was last updated.

35. An information handling system as claimed in claim 27, the determined parameter value being whether a fee is required to access information stored on the node.

36. An information handling system for selectively obtaining information over a network with the information handling system coupled to the network, comprising:

means for executing a program of instructions on the information handling system;

means, coupled to said executing means, for storing the program of instructions executable by said executing means; and means, coupled to said executing means, for coupling the information handling system to the network wherein the program of instructions configures the information handling system to determine a parameter value regarding a node on the network where information is stored such that a determination may be made whether to obtain tie information from the node with the information handling system based upon the determined parameter value, the determined parameter value being one of the group consisting of node availability, present load percentage of node capacity, a connection rate between the node and the information handling system, a time required to download the information stored on the node from the node to the information handling system, compatibility of a program executing on the information handling system and the information stored on the node, whether a required program for utilizing the information stored on the node is available on the information handling system, a date when the information stored on the node was last updated, and whether a fee is required to access information stored on the node.

37. An information handling system as claimed in claim 36, the determined parameter value being node availability.

38. An information handling system as claimed in claim 36, the determined parameter value being present load percentage of node capacity.

39. An information handling system as claimed in claim 36, the determined parameter value being a connection rate between the node and the information handling system.

40. An information handling system as claimed in claim 36, the determined parameter value being a time to download the information stored on the node from the node to the information handling system.

41. An information handling system as claimed in claim 36, the determined parameter value being compatibility of a program executing on the information handling system and the information stored on the node.

42. An information handling system as claimed in claim 36, the determined parameter value being whether a required program for utilizing the information stored on the node is available on the information handling system.

43. An information handling system as claimed in claim 36, the determined parameter value being whether a date when the information stored on the node was last updated.

44. An information handling system as claimed in claim 36, the determined parameter value being whether a fee is required to access information stored on the node.

* * * * *